(12) United States Patent
Liu

(10) Patent No.: US 11,783,791 B2
(45) Date of Patent: Oct. 10, 2023

(54) PANEL DRIVING CIRCUIT AND DISPLAY DEVICE

(71) Applicant: TCL CHINA STAR OPTOELECTRONICS TECHNOLOGY CO., LTD., Guangdong (CN)

(72) Inventor: Jinfeng Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 160 days.

(21) Appl. No.: 17/280,199

(22) PCT Filed: Mar. 16, 2021

(86) PCT No.: PCT/CN2021/080960
§ 371 (c)(1),
(2) Date: Mar. 26, 2021

(87) PCT Pub. No.: WO2022/188194
PCT Pub. Date: Sep. 15, 2022

(65) Prior Publication Data
US 2022/0366864 A1 Nov. 17, 2022

(30) Foreign Application Priority Data
Mar. 8, 2021 (CN) .......................... 202110250256.8

(51) Int. Cl.
*G09G 3/36* (2006.01)
*G02F 1/133* (2006.01)

(52) U.S. Cl.
CPC ........... *G09G 3/36* (2013.01); *G02F 1/13306* (2013.01); *G02F 2201/50* (2013.01); *G09G 2330/021* (2013.01); *G09G 2330/04* (2013.01)

(58) Field of Classification Search
CPC ............... G09G 3/3233; G09G 3/3266; G09G 2300/0408; G09G 2300/0426;
(Continued)

(56) References Cited

U.S. PATENT DOCUMENTS

2021/0358445 A1* 11/2021 Huang ................. G09G 3/3614

FOREIGN PATENT DOCUMENTS

| CN | 1881010 A | 12/2006 |
|---|---|---|
| CN | 105096810 A | 11/2015 |

(Continued)

*Primary Examiner* — Roy P Rabindranath
(74) *Attorney, Agent, or Firm* — PV IP PC; Wei Te Chung; Zhigang Ma

(57) ABSTRACT

A panel driving circuit and a display device are provided. The panel driving circuit includes a control board and a plurality of driving modules. A plurality of first connectors and a plurality of first oblique-insertion-proof protection circuits are disposed on the control board. Each of the driving modules includes a driving circuit board and a plurality of driving chips. The driving circuit board is connected to the plurality of driving chips. A second connector and a second oblique-insertion-proof protection circuit are disposed on each of the driving circuit boards. Irreversible damage to displays caused by improper wiring insertion can be prevented.

11 Claims, 5 Drawing Sheets

(58) Field of Classification Search
CPC ..... G09G 2300/043; G09G 2300/0819; G09G 2300/0842; G09G 2310/0281; G09G 2310/08; G09G 2320/0247; G09G 2320/043; H01L 27/3246; H01L 27/322; H01L 27/327

See application file for complete search history.

(56) References Cited

FOREIGN PATENT DOCUMENTS

| | | | |
|---|---|---|---|
| CN | 109856499 A | | 6/2019 |
| JP | 2006092868 A | | 4/2006 |
| JP | 2006092868 | * | 6/2006 |
| JP | 2008241748 A | | 10/2008 |

* cited by examiner

PANEL DRIVING CIRCUIT AND DISPLAY DEVICE

BACKGROUND OF INVENTION

Field of Invention

The present disclosure relates to the field of display technology and particularly to a panel driving circuit and a display device.

Description of Prior Art

In current liquid crystal display (LCD) products, two circuit boards, which are a control board (Cboard) and a scanning driving board (Xboard) in a horizontal direction of a screen, are connected by flexible flat cables (FFC).

Please refer to FIG. 1. FIG. 1 is a structural schematic diagram of a panel driving circuit of a related technology. During production, the FFC wires are connected to connectors of the scanning driving board (Xboard) in the horizontal direction of the screen and the control board (Cboard). If operation is improper, a problem of oblique insertion is prone to occur. At this time, it is easy to cause chip-on-film (COF) chips (integrated circuits, ICs) to burn out.

Please refer to FIG. 2. FIG. 2 is a structural schematic diagram of an internal power supply circuit of a chip-on-film chip of the related technology. When oblique insertion occurs, grounding leads of connectors corresponding to the oblique insertion are not actually connected to a reference ground, resulting in a scanning driving board (Xboard) in a horizontal direction of a screen on a left side and a scanning driving board (Xboard) in a horizontal direction of a screen on a right side not being commonly grounded. Therefore, difference in electric potentials is present, resulting in voltage jump generated in the ground of the scanning driving board (Xboard) of the horizontal direction of the screen at the position of the oblique insertion. For example, when the oblique insertion occurs on an FCC on the left side, the voltage jump appears in the ground of the scanning driving board (Xboard) in the horizontal direction of the screen on the left side. At this time, a gamma voltage Vgamma is forward biased to a diode or a PN junction, and a large current causes the voltage jump, resulting in a power supply voltage VAA being short-circuited to the ground, causing a large current to burn chips on films. For details, please refer to FIG. 3. FIG. 3 is a schematic diagram of change trends of various voltages of the related technology. An abscissa indicates time and an ordinate indicates voltages. Trends of changes in a power supply voltage VAA, a ground electric level XR GND of the scanning driving board (Xboard) in the horizontal direction of the screen during the oblique insertion occurring, a gamma voltage Vgamma, and a ground electric level XC GND of the control board are specifically shown in FIG. 3. Because there is no related protection mechanism in the related technology, when the FFC wire is inserted obliquely, it is easy to cause irreversible damage to liquid crystal display products.

SUMMARY OF INVENTION

Embodiments of the present disclosure provide a panel driving circuit and a display device, which can prevent irreversible damage to the display caused by improper wiring insertion.

An embodiment of the present disclosure provides a panel driving circuit, including: a control board and a plurality of driving module, wherein:

a plurality of first connectors and a plurality of first oblique-insertion-proof protection circuits are disposed on the control board, each of the first oblique-insertion-proof protection circuits is connected to the first connector at a corresponding position or is disposed on the first connector at the corresponding position;

each of the driving modules includes a driving circuit board and a plurality of driving chips, the driving circuit board is connected to the plurality of driving chips, a second connector and a second oblique-insertion-proof protection circuit are disposed on each of the driving circuit boards, each of the first connectors is connected to the second connector at a corresponding position through an electrical cable respectively, each of the second oblique-insertion-proof protection circuits is connected to the second connector at the corresponding position or is disposed on the second connector at the corresponding position; and the first oblique-insertion-proof protection circuits and the second oblique-insertion-proof protection circuits are configured to protect the driving chips when the electrical cable is inserted obliquely.

Furthermore, the first oblique-insertion-proof protection circuits include first grounding modules and second grounding modules, the first grounding module and the second grounding module are correspondingly connected to leads on two ends of the first connector to ground the leads on the two ends of the first connector; and the second oblique-insertion-proof protection circuits include third grounding modules and fourth grounding modules, the third grounding module and the fourth grounding module correspondingly connected to leads on two ends of the second connector to ground the leads on the two ends of the second connector.

Furthermore, the first grounding modules include first grounding resistors, the second grounding modules include second grounding resistors, the third grounding modules include third grounding resistors, and the fourth grounding modules include fourth grounding resistors.

Furthermore, the first oblique-insertion-proof protection circuits include first feedback detecting leads, the first feedback detecting leads are disposed on the first connectors;

the second oblique-insertion-proof protection circuits include second feedback detecting leads, the second feedback detecting leads are disposed on the second connectors, the first feedback detecting leads are connected to the second feedback detecting leads at corresponding positions, and the first feedback detecting leads and the second feedback detecting leads are configured to output oblique-insertion detection signals.

Furthermore, the first feedback detecting leads are disposed on central positions of the first connectors, and the second feedback detecting leads are disposed on central positions of the second connectors.

Furthermore, a power management circuit is further disposed on the control board. The power management circuit includes an AND gate, a logic control module, and an output module, a plurality of input terminals of the AND gate are connected to the second feedback detecting leads at the corresponding position s, an output terminal of the AND gate is connected to an input terminal of the output module through the logic control module, and output terminals of the output module respectively output a first power supply voltage, a second power supply voltage, and a third power supply voltage.

Furthermore, the second power supply voltage is greater than the first power supply voltage.

Furthermore, the third power supply voltage is a gamma voltage.

Furthermore, a time sequence of voltages outputted to the driving chips by the power management circuit is outputting the first power supply voltage first, and then outputting the second power supply voltage and the third power supply voltage to the driving chips after the driving chips work normally.

Embodiments of the present disclosure provide a display device, including a display panel and the panel driving circuit provided by the embodiments of the present disclosure, wherein the panel driving circuit is connected to the display panel to drive the display panel to work.

In the embodiments of the present disclosure, by disposing the control board and the plurality of driving modules, wherein the plurality of first connectors and the plurality of first oblique-insertion-proof protection circuits are disposed on the control board, each of the first oblique-insertion-proof protection circuits is connected to the first connector at the corresponding position or is disposed on the first connector at the corresponding position, each of the driving modules includes the driving circuit board and the plurality of driving chips, the second connector and the second oblique-insertion-proof protection circuit are disposed on each of the driving circuit boards, each of the first connectors is connected to the second connector at a corresponding position through the electrical cable respectively, each of the second oblique-insertion-proof protection circuits is connected to the second connector at the corresponding position or is disposed on the second connector at the corresponding position, the first oblique-insertion-proof protection circuits and the second oblique-insertion-proof protection circuits are configured to protect the driving chips when the electrical cable is inserted obliquely, i.e., when oblique insertion of the electrical cable occurs, the first oblique-insertion-proof protection circuit and the second oblique-insertion-proof protection circuit can prevent the driving chip from being burned out due to voltage jumps and can exert a protective effect. Therefore, the embodiments of the present disclosure can prevent irreversible damage to displays caused by poor wiring insertion.

DESCRIPTION OF DRAWINGS

To more clearly illustrate the technical solutions of the embodiments of the present disclosure, the accompanying figures of the present disclosure will be described in brief. Obviously, the accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
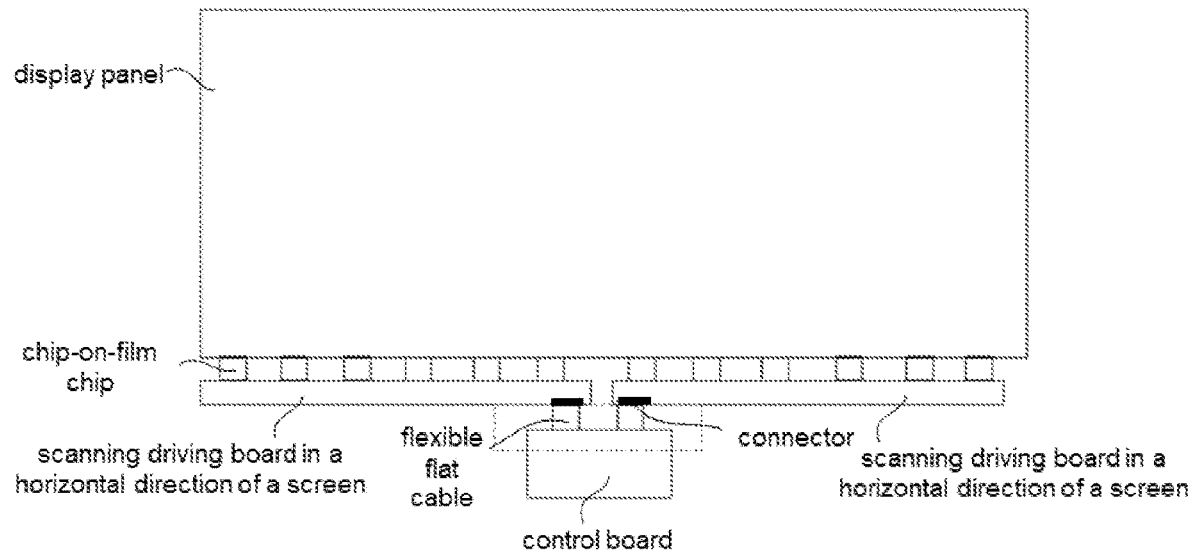
FIG. 1 is a structural schematic diagram of a panel driving circuit of the related technology.
Figure 2:
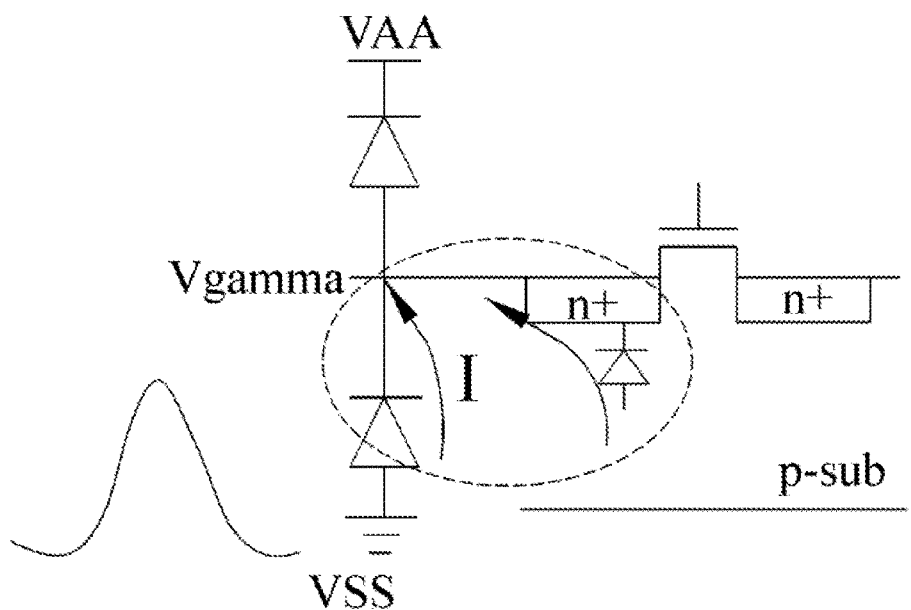
FIG. 2 is a structural schematic diagram of an interior of a chip-on-film chip of the related technology.
Figure 3:
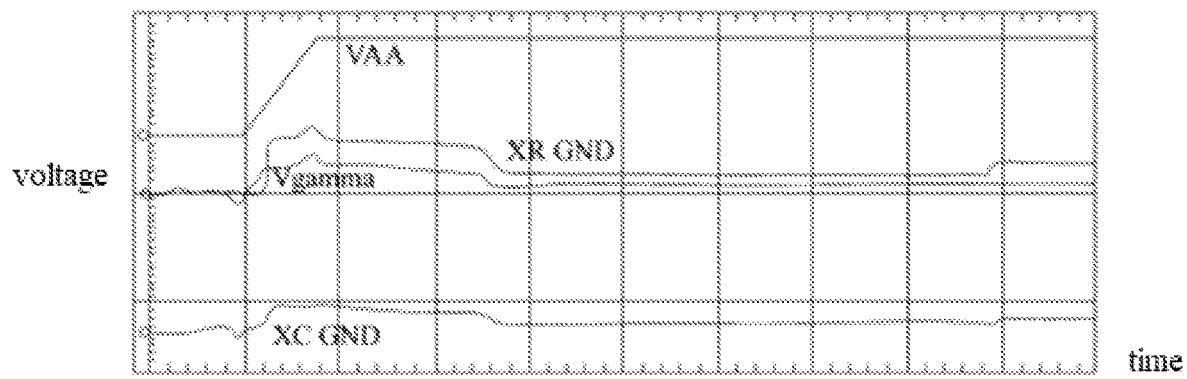
FIG. 3 is a schematic diagram of trends of changes in various voltages of the related technology.

The technical solutions in the embodiments of the present disclosure are clearly and completely described in the following with reference to the accompanying drawings in the embodiments of the present disclosure. Obviously, the described embodiments are only part of the embodiments of the present disclosure, but are not all embodiments of the present disclosure. All other embodiments obtained from those skilled in the art based on the embodiments of the present disclosure without creative efforts are within the scope of the present disclosure.

One embodiment of the present disclosure provides a panel driving circuit, including:

a control board and a plurality of driving modules, wherein:

a plurality of first connectors and a plurality of first oblique-insertion-proof protection circuits are disposed on the control board, each of the first oblique-insertion-proof protection circuits is connected to the first connector at a corresponding position or is disposed on the first connector at the corresponding position;

each of the driving modules includes a driving circuit board and a plurality of driving chips, the driving circuit board is connected to the plurality of driving chips, a second connector and a second oblique-insertion-proof protection circuit are disposed on each of the driving circuit boards, each of the first connectors is connected to the second connector at a corresponding position through an electrical cable respectively, each of the second oblique-insertion-proof protection circuits is connected to the second connector at the corresponding position or is disposed on the second connector at the corresponding position; and the first oblique-insertion-proof protection circuits and the second oblique-insertion-proof protection circuits are configured to protect the driving chips when the electrical cable is inserted obliquely.

In one embodiment of the present disclosure, the first oblique-insertion-proof protection circuits include first grounding modules and second grounding modules, the first grounding module and the second grounding module are correspondingly connected to leads on two ends of the first connector to ground the leads on the two ends of the first connector; and the second oblique-insertion-proof protection circuits include third grounding modules and fourth grounding modules, the third grounding module and the fourth grounding module are correspondingly connected to leads on two ends of the second connector to ground the leads on the two ends of the second connector.

In one embodiment of the present disclosure, the first grounding modules include first grounding resistors, the second grounding modules include second grounding resistors, the third grounding modules include third grounding resistors, and the fourth grounding modules include fourth grounding resistors.

In one embodiment of the present disclosure, the first oblique-insertion-proof protection circuits include first feedback detecting leads, the first feedback detecting leads are disposed on the first connectors.

The second oblique-insertion-proof protection circuits include second feedback detecting leads, the second feedback detecting leads are disposed on the second connectors, the first feedback detecting leads are connected to the second feedback detecting leads at corresponding positions, and the first feedback detecting leads and the second feedback detecting leads are configured to output oblique-insertion detection signals.

In one embodiment of the present disclosure, the first feedback detecting leads are disposed on central positions of the first connectors, and the second feedback detecting leads are disposed on central positions of the second connectors.

In one embodiment of the present disclosure, a power management circuit is further disposed on the control board. The power management circuit includes an AND gate, a logic control module, and an output module. A plurality of input terminals of the AND gate are connected to the second feedback detecting leads at the corresponding position s, an output terminal of the AND gate is connected to an input terminal of the output module through the logic control module, and output terminals of the output module respectively output a first power supply voltage, a second power supply voltage, and a third power supply voltage.

In one embodiment of the present disclosure, the second power supply voltage is greater than the first power supply voltage.

In one embodiment of the present disclosure, the third power supply voltage is a gamma voltage.

In one embodiment of the present disclosure, a time sequence of voltages outputted to the driving chips by the power management circuit is outputting the first power supply voltage first, and then outputting the second power supply voltage and the third power supply voltage to the driving chips after the driving chips work normally.

In one embodiment of the present disclosure, after color compression signals, control signals, and power supply signals are received by the control board and processed by a time schedule controller of the control board, processed signals are transmitted to the driving module and are transmitted to a display panel by the driving module.

In one embodiment of the present disclosure, the driving circuit board generates scanning control driving signals in a horizontal direction of a screen according to time sequence signals transmitted by the control board.

One embodiment of the present disclosure further provides a display panel, including a display panel and the aforesaid panel driving circuit. The panel driving circuit is connected to the display panel to drive the display panel to work.

Figure 4:
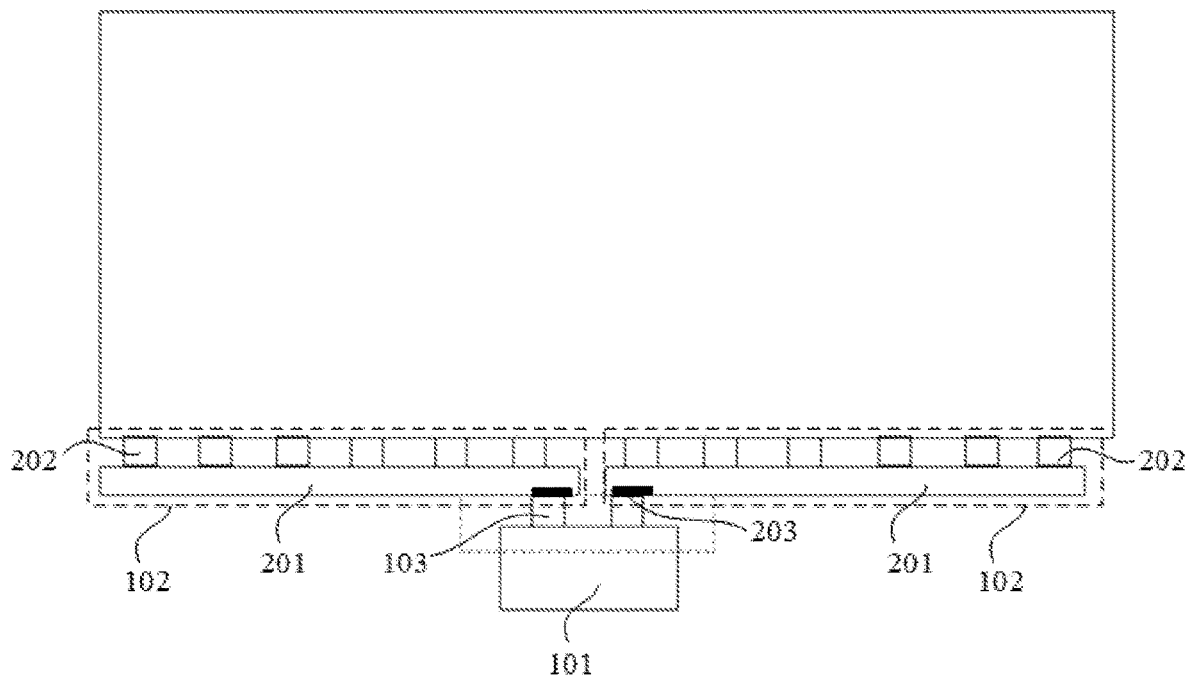
FIG. 4 is a schematic diagram of a circuit structure of a panel driving circuit provided by one embodiment of the present disclosure.

Please refer to FIG. 4. FIG. 4 is a schematic diagram of a circuit structure of a panel driving circuit provided by one embodiment of the present disclosure. The panel driving circuit includes a control board 101 and a plurality of driving module 105. The control board 101 is connected to the plurality of driving module 105, and the control board 101 can be named Cboard.

It should be noted that the panel driving circuit including two driving modules 102 is taken as an example for illustration in FIG. 4. In practical applications, a number of the driving modules can be adjusted according to specific requirements. For example, the number of driving modules is 4, etc. It can be understood that the number of the driving modules employed is related to a dimension of the display panel. For example, when the size of the display panel is 65 inches, two driving modules can be used for driving; when the size of the display panel is more than 65 inches, four driving modules can be used for driving. The number of the driving modules is not limited in the embodiments of the present disclosure.

Wherein, the plurality of first connectors and the plurality of first oblique-insertion-proof protection circuits (not shown in FIG. 4) are disposed on the control board 101, each of the first oblique-insertion-proof protection circuits is connected to the first connector at a corresponding position or is disposed on the first connector at the corresponding position, i.e., each of the first oblique-insertion-proof protection circuits is correspondingly connected to one first connector, respectively; or each of the first oblique-insertion-proof protection circuits is disposed on one first connector on different positions.

Regarding the driving module 102, each of the driving module 102 includes a driving circuit board 201 and a plurality of driving chips 202, i.e., each of the driving modules 102 includes one driving circuit board 201 and a plurality of driving chips 202. Each of the driving modules 102 including six driving modules 202 is taken as an example for illustration in FIG. 4. In practical applications, a number of the driving chips of the driving modules can be adjusted correspondingly according to specific requirements. For example, the number of driving chips of each driving module can be increased or decreased according to practical applications. For example, the number of driving chips in each driving chip can be configured to be 4. For another example, the number of driving chips in each driving module can be configured to be 8, etc.

In one embodiment of the present disclosure, the driving circuit board 201 is connected to the plurality of driving chips 202. A second connector 203 and a second oblique-insertion-proof protection circuit (not shown in FIG. 4) are disposed on each of the driving circuit boards 201. Each of the first connectors is connected to the second connector 203 at a corresponding position through an electrical cable 103 respectively. Each of the second oblique-insertion-proof protection circuits is connected to the second connector 203 at the corresponding position or is disposed on the second connector 203 at the corresponding position. In one embodiment, the electrical cable 103 can be a flexible flat cable, i.e., FFC.

After color compression signals, control signals, and power supply signals are received by the control board 101 and processed by a time schedule controller of the control board 101, processed signals are transmitted to the driving module 102 and are transmitted to a display panel by the driving module 102, which can make the display panel obtain power and signals needed to present images, so that the display panel can display corresponding images.

Wherein, the driving circuit board 201 can generate scanning control driving signals in a horizontal direction of a screen according to time sequence signals transmitted by the control board 101. The first oblique-insertion-proof protection circuits and the second oblique-insertion-proof protection circuits are configured to protect the driving chips 202 when the electrical cable 103 is inserted obliquely. For example, when the electrical cable 103 is inserted obliquely, voltage is not transmitted to the driving chips 202 to prevent the driving chips 202 from being burned out; or when the electrical cable 103 is inserted obliquely, leads at corresponding positions of oblique insertion on first connectors 104 and the second connectors 203 are forcibly grounded to ensure all the driving chips 201 are commonly grounded, preventing voltage jump and avoiding the driving chip 202 from being burned out.

In the embodiments of the present disclosure, by disposing the control board 101 and the plurality of driving modules 102, wherein the plurality of first connectors and the plurality of first oblique-insertion-proof protection circuits are disposed on the control board 101, each of the first oblique-insertion-proof protection circuits is connected to the first connector at the corresponding position or is disposed on the first connector at the corresponding position, each of the driving modules 102 includes the driving circuit board 201 and the plurality of driving chips 202, the second connector 203 and the second oblique-insertion-proof protection circuit are disposed on each of the driving circuit boards 201, each of the first connectors is connected to the second connector 203 at a corresponding position through the electrical cable 103 respectively, each of the second oblique-insertion-proof protection circuits is connected to the second connector 203 at the corresponding position or is disposed on the second connector 203 at the corresponding position, the first oblique-insertion-proof protection circuits and the second oblique-insertion-proof protection circuits are configured to protect the driving chips 202 when the electrical cable is inserted obliquely. That is, when oblique insertion of the electrical cable 103 occurs, the first oblique-insertion-proof protection circuit and the second oblique-insertion-proof protection circuit can prevent the driving chip 202 from being burned out due to voltage jumps and can exert a protective effect.

For example, when the electrical cable 103 is inserted obliquely, voltage is not transmitted to the driving chips 202 to prevent the driving chips 202 from being burned out; or when the electrical cable 103 is inserted obliquely, leads at corresponding positions of oblique insertion on first connectors 104 and the second connectors 203 are forcibly grounded to ensure all the driving chips 201 are commonly grounded, preventing voltage jump and avoiding the driving chip 202 from being burned out. Therefore, embodiments of the present disclosure can prevent irreversible damage to the display caused by improper wiring insertion.

For example, in one embodiment, the first oblique-insertion-proof protection circuits can include the first grounding modules and the second grounding modules. The first grounding module and the second grounding module are correspondingly connected to leads on two ends of the first connector to ground the leads on the two ends of the first connector. That is, the first grounding module is connected to the leads on one end of the first connector, and the second grounding module is connected to the leads on the other end of the first connector. The leads of one end of the first connector are grounded through the first grounding module. The leads of the other end of the first connector are grounded through the second grounding module. For example, if 60 leads are disposed on the first connector, then the first grounding module can be connected to a first lead of the first connector, and the second grounding module can be connected to the 60th lead of the first connector; or the first grounding module can be connected to the 60th lead of the first connector, and the second grounding module can be connected to the first lead of the first connector. When the electrical cable 103 is inserted into the first connector, if oblique insertion occurs, the first lead and the 60th lead of the first connector being grounded can also be ensured, thereby realizing common grounding between all the driving circuit boards 201, thereby avoiding the voltage jump, preventing the driving chip 202 from being burned out.

For another example, in one embodiment, if 80 leads are disposed on the first connector, then the first grounding module can be connected to a first lead of the first connector, and the second grounding module can be connected to the 80th lead of the first connector; or the first grounding module can be connected to the 80th lead of the first connector, and the second grounding module can be connected to the first lead of the first connector. When the electrical cable 103 is inserted into the first connector, if oblique insertion occurs, the first lead and the 80th lead of the first connector being grounded can also be ensured, thereby realizing common grounding between all the driving circuit boards 201, thereby avoiding the voltage jump, preventing the driving chip 202 from being burned out.

The second oblique-insertion-proof protection circuits include third grounding modules and fourth grounding modules. The third grounding module and the fourth grounding module correspondingly are connected to leads on two ends of the second connector 203 to ground the leads on the two ends of the second connector 203. That is, the third grounding module is connected to the leads on one end of the second connector 203, and the fourth grounding module is connected to the leads on the other end of the second connector 203. The leads of one end of the second connector 203 is grounded through the third grounding module. The leads of the other end of the second connector 203 is grounded through the fourth grounding module. For example, if 60 leads are disposed on the second connector 203, then the third grounding module 203 can be connected to a first lead of the second connector, and the fourth grounding module can be connected to the 60th lead of the second connector 203; or the third grounding module can be connected to the 60th lead of the second connector 203, and the fourth grounding module can be connected to the first lead of the second connector 203. When the electrical cable 103 is inserted into the second connector 203, if oblique insertion occurs, the first lead and the 60th lead of the second connector 203 being grounded can also be ensured, thereby realizing common grounding between all the driving circuit boards 201, thereby avoiding the voltage jump, preventing the driving chip from burned out.

For another example, in one embodiment, if 80 leads are disposed on the second connector 203, then the third grounding module can be connected to a first lead of the second connector 203, and the fourth grounding module can be connected to the 80th lead of the second connector 203; or the third grounding module can be connected to the 80th lead of the second connector 203, and the fourth grounding module can be connected to the first lead of the second connector 203. When the electrical cable 103 is inserted into the second connector 203, if oblique insertion occurs, the first lead and the 80th lead of the second connector 203 being grounded can also be ensured, thereby realizing common grounding between all the driving circuit boards 201, thereby avoiding the voltage jump, preventing the driving chip from burned out.

Figure 5:
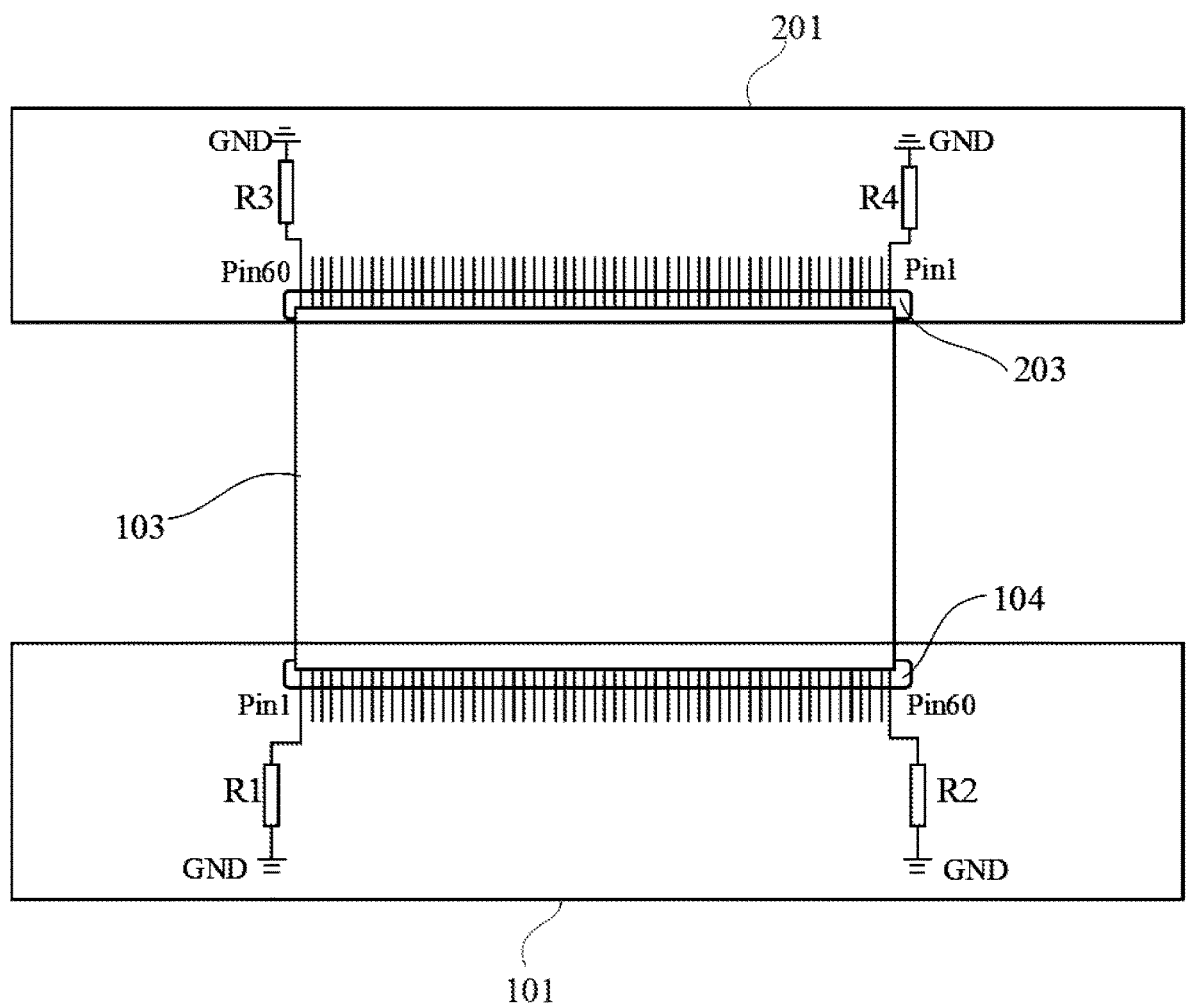
FIG. 5 is a schematic diagram of a scene of disposing grounding resistors provided by one embodiment of the present disclosure.

For example, in one embodiment, please refer to FIG. 5. FIG. 5 is a schematic diagram of a scene of disposing grounding resistors provided by one embodiment of the present disclosure. Specifically, the first grounding modules include first grounding resistors R1, the second grounding modules include second grounding resistors R2, the third grounding modules include third grounding resistors R3, and the fourth grounding modules include fourth grounding resistors R4.

For example, taking the first connector 104 and the second connector 203 both provided with 60 leads as an example for illustration, of course, in practical applications, the number of leads disposed on the first connector 104 and the second connector 203 can be adjusted accordingly according to actual requirements, for example, 80 leads can be configured. The leads on two ends of the first connector 104 and the second connector 203 are grounding leads. A first grounding resistor R1 is added on the first lead on each first connector 104 on the circuit board 101. A second grounding resistor R2 is added on the 60th leads on each first connector 104 on the circuit board 101. A third grounding resistor R3 is added on the 60th lead on the second connector 203 on each driving circuit board 201. A fourth grounding resistor R4 is added on the 60th leads on the second connector 203 on each driving circuit board 201. By adding the grounding resistors, input of the leads on the two ends of the first connector 104 and the second connector 203 are not insulated from external influence, which may lower the electric level.

When the electrical cable 103 is inserted obliquely, if the lead at one end of the connector is not properly connected, due to the lead at the other end of the connector provided with the added grounding resistor, driving circuit board 201 connected to the reference ground can be ensured. It can be understood that even if the electrical cable 103 is inserted obliquely, all the driving circuit boards 201 being commonly grounded can still be ensured. In this way, the voltage jump during oblique insertion can be avoided, so that the driving chip 202 can be protected and the driving chip 202 can be prevented from being burned out. The effective mechanism preventing the cable 103 from being inserted obliquely can avoid irreversible damage to the display caused by improper wiring insertion.

For example, in one embodiment, the grounding resistors are only added to the lead at one end of the first connector and one end of the second connector. In this case, when the cable is inserted obliquely, if the leads on the ends of the added grounding resistors of the connectors are not connected, because grounding resistors are not added on the leads of the other ends of the connectors, the driving circuit boards cannot be commonly grounded as a result. Therefore, prevention of driving chips being burned out cannot be ensured completely.

For example, in one embodiment, the first oblique-insertion-proof protection circuits include first feedback detecting leads, and the first feedback detecting leads are disposed on the first connectors 104. The second oblique-insertion-proof protection circuits include second feedback detecting leads. The second feedback detecting leads are disposed on the second connectors 203. The first feedback detecting leads are connected to the second feedback detecting leads at corresponding positions, i.e., the first feedback detecting lead and the second feedback detecting lead at the corresponding position are connected. The first feedback detecting leads and the second feedback detecting leads are configured to output oblique-insertion detection signals to execute anti-oblique insertion detection.

Generally, the first feedback detecting leads are disposed on central positions of the first connectors 104, and the second feedback detecting leads are disposed on central positions of the second connectors 203. For example, 60 leads are disposed on both first connector 104 and the second connector 203, a 29th lead of the first connector 104 can be selected to act as the first feedback detecting lead, and a 29th lead of the second connector 203 can be selected to act as the second feedback detecting lead. For another example, a 32nd lead of the first connector 104 can be selected to act as the first feedback detecting lead, and a 32nd lead of the second connector 203 can be selected to act as the second feedback detecting lead.

For example, in one embodiment, 80 leads are disposed on both first connector 104 and the second connector 203, a 39th lead of the first connector 104 can be selected to act as the first feedback detecting lead, and a 39th lead of the second connector 203 can be selected to act as the second feedback detecting lead. For another example, a 42nd lead of the first connector 104 can be selected to act as the first feedback detecting lead, and a 42nd lead of the second connector 203 can be selected to act as the second feedback detecting lead.

Preferably, the first feedback detecting leads can be disposed on central positions of the first connectors 104, and the second feedback detecting leads can be disposed on central positions of the second connectors 203. For example, 60 leads are disposed on both first connector 104 and the second connector 203, a 30th lead of the first connector 104 can be selected to act as the first feedback detecting lead, and a 30th lead of the second connector 203 can be selected to act as the second feedback detecting lead. For another example, a 31st lead of the first connector 104 can be selected to act as the first feedback detecting lead, and a 31st lead of the second connector 203 can be selected to act as the second feedback detecting lead.

For example, in one embodiment, 80 leads are disposed on both first connector 104 and the second connector 203, a 39th lead of the first connector 104 can be selected to act as the first feedback detecting lead, and a 39th lead of the second connector 203 can be selected to act as the second feedback detecting lead. For another example, a 41st lead of the first connector 104 can be selected to act as the first feedback detecting lead, and a 41st lead of the second connector 203 can be selected to act as the second feedback detecting lead.

Because as long as the electrical cable 103 is aligned with the center positions of the first connectors 104 and the second connectors 203, the two ends of the electrical cable 103 can also be aligned with the two ends of the first connectors 104 and the second connectors 203. When the first feedback detecting lead and the second feedback detecting lead detect that the electrical cable 103 is inserted obliquely, the voltage outputted to the driving chip 202 can be stopped to protect the driving chip 202 from being burned out.

Figure 6:
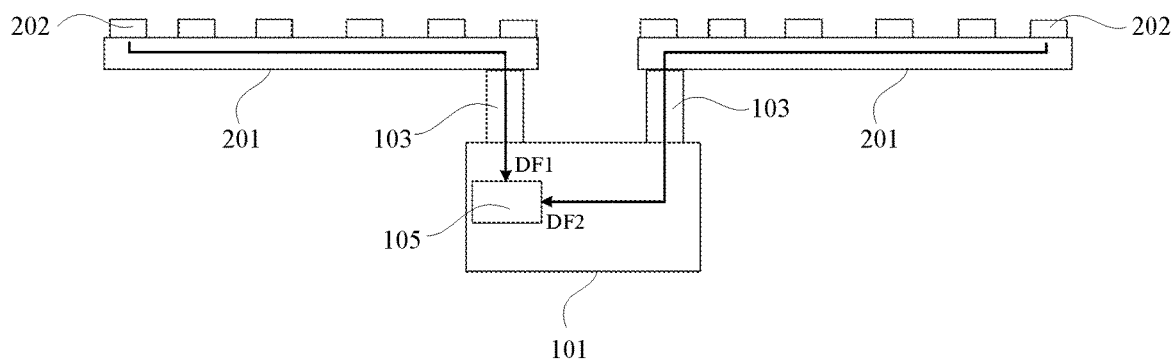
FIG. 6 is a schematic diagram of a scene of disposing feedback detecting leads provided by one embodiment of the present disclosure.

Please refer to FIG. 6. FIG. 6 is a schematic diagram of a scene of disposing feedback detecting leads provided by one embodiment of the present disclosure. For example, if the first connectors and the second connectors are interfaces with 60 leads, a 26th lead near the center positions can be selected as the feedback detecting leads DF1, DF2, which have detected function (DF). Because two driving circuit boards 201 are used as an example for description in FIG. 6, the corresponding second feedback detecting leads on each driving circuit board 201 are respectively indicated as DF1 and DF2. If there are four driving circuit boards 201 included, then the corresponding second feedback detecting leads on each driving circuit board 201 are respectively indicated as DF1, DF2, DF3, DF4, etc.

Figure 7:
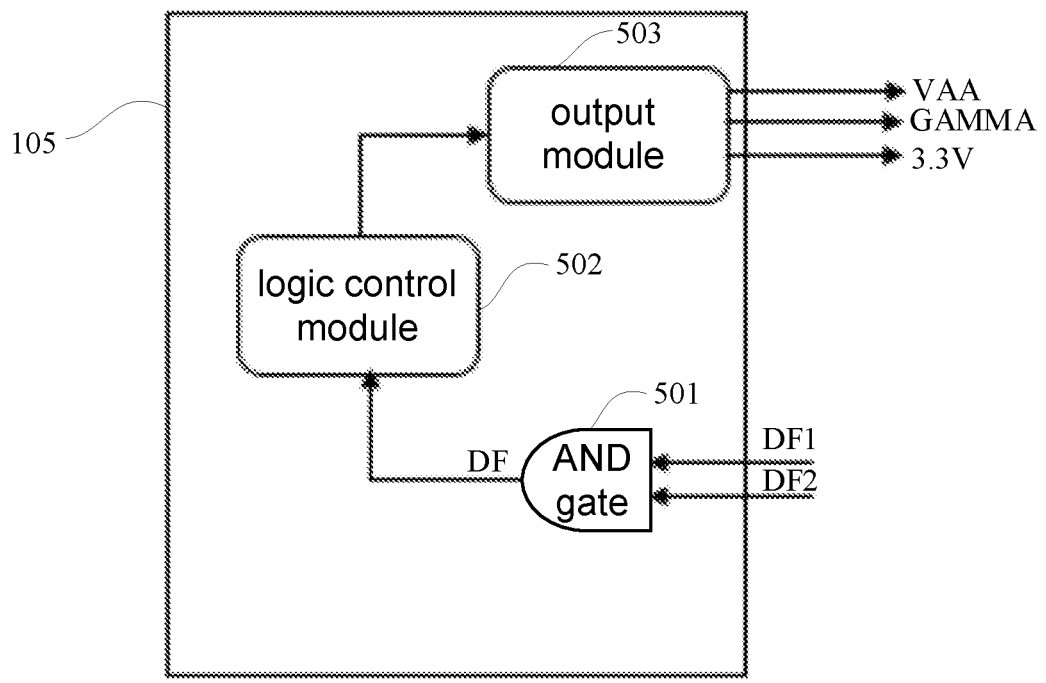
FIG. 7 is a structural schematic diagram of a power management circuit provided by one embodiment of the present disclosure.

For example, in one embodiment, a power management circuit is further disposed on the control board 101. Please refer to FIG. 7. FIG. 7 is a structural schematic diagram of a power management circuit provided by one embodiment of the present disclosure. The power management circuit 105 can be a power management integrated circuit (PMIC).

The power management circuit can include an AND gate 501, a logic control module 502, and an output module 503. Wherein, a plurality of input terminals of the AND gate 501 are connected to the second feedback detecting leads at the corresponding positions, an output terminal DF of the AND gate 501 is connected to an input terminal of the output module 503 through the logic control module 502, and three output terminals of the output module 503 respectively output a first power supply voltage, a second power supply voltage VAA, and a third power supply voltage GAMMA. In one embodiment of the present disclosure, the first power supply voltage can be 3.3V. In practical applications, the first power supply voltage can be other voltage value.

Wherein, the second power supply voltage VAA is larger than 3.3V of the first power supply voltage, and the third power supply voltage GAMMA is a gamma voltage. A value of the second power supply voltage VAA can range from 16V to 18V. A value of the third power supply voltage GAMMA can range from 0.3V to 16V. The third power supply voltage GAMMA is used for calibration.

For example, taking two driving circuit boards 201 as an example, when the 26th leads close to the centers of the first connector 104 and the second connector 203 are selected as the second detection feedback leads DF1, DF2, working logic of the outputted oblique-insert detection signals is that when the driving chip 202 of chip-on-film (COF) receives the 3.3V voltage provided by the power management circuit 105, and then after logic modules in the driving chips 202 work normally, the driving chips 202 make signals of second feedback detecting leads DF1, DF2 be high electric level. At this time, the high electric level signals are transmitted to the power management circuit 105 on the control board 101 through the electrical cable 103, and the signals of the second feedback detecting leads DF1, DF2 are processes in the power management circuit 105 through the AND gate 501 and then transmitted to the logic control module 502.

For example, in one embodiment of the present disclosure, a time sequence of voltages outputted to the driving chips 202 by the power management circuit 105 is outputting the first power supply voltage first with 3.3V, and then outputting the second power supply voltage VAA and the third power supply voltage GAMMA to the driving chips 202 by the power management circuit 105 after the driving chips work normally. By configuring the feedback detecting leads, the second power supply voltage VAA and the third power supply voltage GAMMA can be cut off from an output source of the power supply, preventing the burning problem of the driving chips 202.

Figure 8:
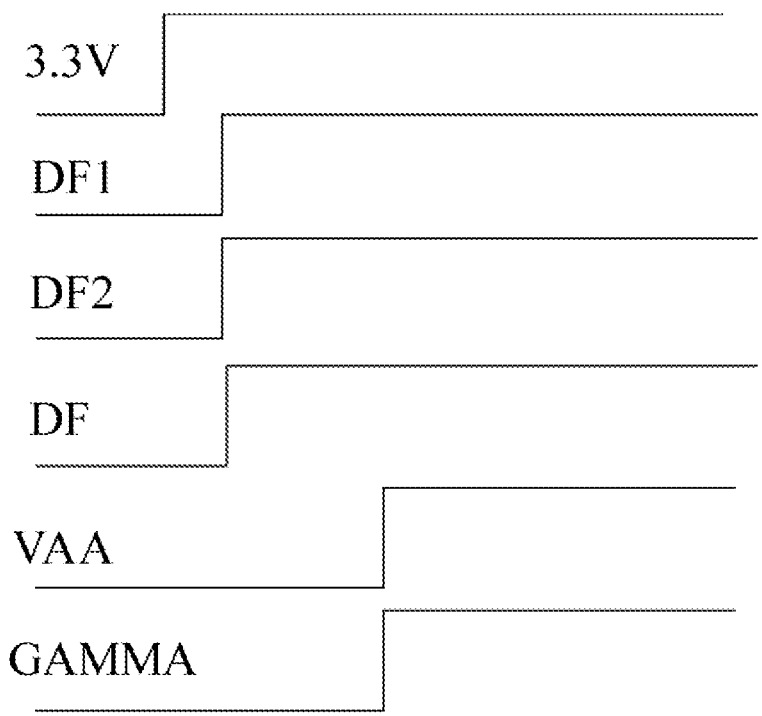
FIG. 8 is a schematic diagram of waveforms of electric levels of signals of power management circuit terminals when an electrical cable is normally connected provided by one embodiment of the present disclosure.

For example, in one embodiment, please refer to FIG. 8, FIG. 8 is a schematic diagram of waveforms of electric levels of signals of power management circuit terminals when the electrical cable is normally connected provided by one embodiment of the present disclosure. When the electrical cable is normally connected, i.e., when the electrical cable is not inserted obliquely, the electrical cable and all the leads on the first connectors and all the leads on the second connectors are aligned and connected. After the driving chips receive the first power supply voltage of 3.3V, the oblique-insertion detection signals are outputted to the two second feedback detecting leads DF1, DF2. The oblique-insertion detection signals of the two second feedback detecting leads are both high electric levels. As illustrated in FIG. 7, the detected function (DF) signal that from the signals of the two second feedback detecting leads DF1, DF2 outputted by the AND gate 501 is also high electric level. The AND gate 501 transmits the detected function (DF) signal to the logic control module 502, and the second power supply voltage VAA and the third power supply voltage GAMMA are transmitted to the driving chip 202 normally.

Figure 9:
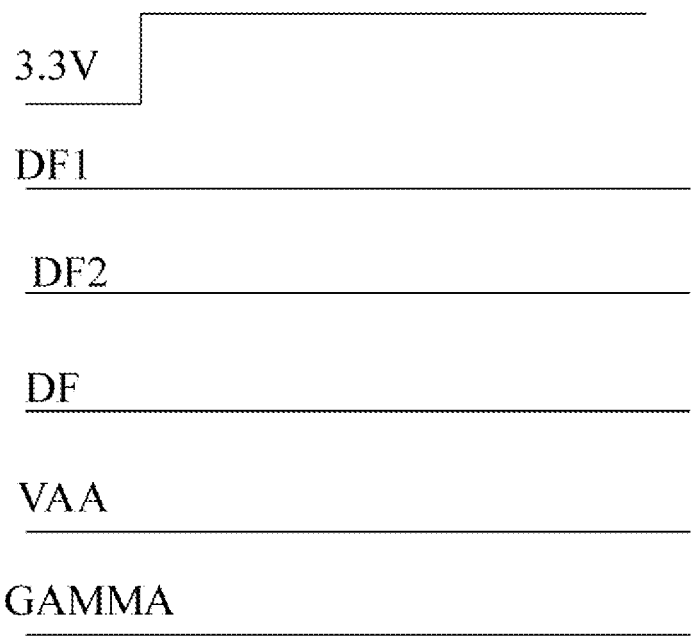
FIG. 9 is a schematic diagram of waveforms of electric levels of signals of power management circuit terminals when the electrical cable is not normally connected provided by one embodiment of the present disclosure.

For example, in one embodiment, please refer to FIG. 9, FIG. 9 is a schematic diagram of waveforms of electric levels of signals of power management circuit terminals when the electric level is not normally connected provided by one embodiment of the present disclosure. When the electrical cable is not connected normally, i.e., when the cable is inserted obliquely, there are two possibilities at this time. One of the possibilities may be that the electrical cable is not connected to the leads where the first power supply voltage of 3.3V is. At this time, the driving chip does not receive the 3.3V voltage, and the oblique-insertion detection signals of the two second feedback detecting leads DF1, DF2 are both low electric levels, and the power management circuit does not output the second power supply voltage VAA and the third power supply voltage GAMMA to the driving chip.

Another possibility is that even though the electrical cable is inserted obliquely, the lead where the first power supply voltage of 3.3V is located happens to be connected. The driving chip receives the first power supply voltage of 3.3V and the oblique-insertion detection signals outputted to the two second feedback detecting leads DF1 and DF2 by the logic module in the driving chip are high electric levels. The high electric levels are transmitted in a direction to the power management circuit on the control board. However, because it is impossible that two separated leads can be connected at the same time during oblique insertion, the second feedback detecting leads DF1 and DF2 cannot be connected to the control board at this time (wherein, the two separated leads are the lead of the first power supply voltage of 3.3V and the second feedback detecting leads DF1 and DF2, and generally, when selecting the feedback detecting lead, a lead at a distance from the lead where the first power supply voltage of 3.3V is located is selected as the feedback detecting lead). An abnormal state is illustrated in FIG. 9. The oblique-insertion detection signals of the two second feedback detecting leads DF1 and DF2 identified by the power management circuit on the control board are at low electric levels (default being low electric level when not elevated to high electric level). At this time, the power management circuit no longer outputs the second power supply voltage VAA and the third power supply voltage GAMMA to the driving chip, i.e., the driving chip will no longer be burned out during oblique insertion of the electrical cable, which protects the driving chip. The screen cannot be lit up at this time, and users are reminded to check and to re-plug the electrical cable normally to avoid irreversible damage to the display.

Figure 10:
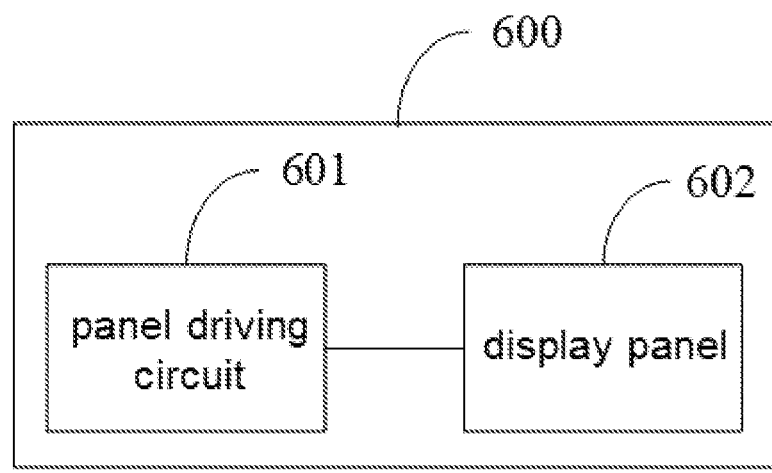
FIG. 10 is a structural schematic diagram of a display device provided by one embodiment of the present disclosure.

One embodiment of the present disclosure further provides a display device. Please refer to FIG. 10, FIG. 10 is a structural schematic diagram of a display device provided by one embodiment of the present disclosure. The display device 600 includes the display panel 602 and the panel driving circuit 601 provided by the embodiments of the present disclosure. The panel driving circuit 601 is connected to the display panel 602 to drive the display panel 602 to work, i.e., the display panel 602 is driven to display.

It should be noted that the aforesaid embodiments of the present disclosure can be combined with each other to jointly protect the driving chips during oblique insertion of the electrical cable, thereby avoiding irreversible damage to the display caused by improper wiring insertion. The examples are not illustrated again herein.

A person of ordinary skill in the art may be aware that, in combination with the examples described in the embodiments disclosed in this specification, units and algorithm steps may be implemented by electronic hardware, computer software, or a combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication and connections may be implemented through some interfaces. The indirect couplings or communication and connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The aforesaid storage medium includes any medium that can store program code, such as a USB flash drive, a removable hard disk, a read-only memory (ROM), a random access memory (RAM), a magnetic disk, or an optical disc, etc.

What is claimed is:

1. A panel driving circuit, comprising:
    a control board and a plurality of driving modules, wherein
    a plurality of first connectors and a plurality of first oblique-insertion-proof protection circuits are disposed on the control board, each of the first oblique-insertion-proof protection circuits is connected to a first connector at a corresponding position or is disposed on the first connector at the corresponding position;
    each of the driving modules comprises a driving circuit board and a plurality of driving chips, the driving circuit board is connected to the plurality of driving chips, a second connector and a second oblique-insertion-proof protection circuit are disposed on each of the driving circuit boards, each of the first connectors is connected to a second connector at a corresponding position through an electrical cable respectively, each of the second oblique-insertion-proof protection circuits is connected to the second connector at the corresponding position or is disposed on the second connector at the corresponding position; and
    the first oblique-insertion-proof protection circuits and the second oblique-insertion-proof protection circuits are configured to protect the driving chips when the electrical cable is inserted obliquely;
    the first oblique-insertion-proof protection circuits comprise first grounding modules and second grounding modules, the first grounding modules and the second grounding modules are correspondingly connected to leads on two ends of the first connectors to ground the leads on the two ends of the first connectors; and
    the second oblique-insertion-proof protection circuits comprise third grounding modules and fourth grounding modules, the third grounding modules of the fourth grounding modules are correspondingly connected to leads on two ends of the second connectors to ground the leads on the two ends of the second connectors.

2. The panel driving circuit as claimed in claim 1, wherein the first grounding modules comprise first grounding resistors, the second grounding modules comprise second grounding resistors, the third grounding modules comprise third grounding resistors, and the fourth grounding modules comprise fourth grounding resistors.

3. The panel driving circuit as claimed in claim 1, wherein the first oblique-insertion-proof protection circuits comprise first feedback detecting leads, the first feedback detecting leads are disposed on the first connectors;
    the second oblique-insertion-proof protection circuits comprise second feedback detecting leads, the second feedback detecting leads are disposed on the second connectors, the first feedback detecting leads are connected to the second feedback detecting leads at corresponding positions, and the first feedback detecting leads and the second feedback detecting leads are configured to output oblique-insertion detection signals.

4. The panel driving circuit as claimed in claim 3, wherein the first feedback detecting leads are disposed on central positions of the first connectors, and the second feedback detecting leads are disposed on central positions of the second connectors.

5. The panel driving circuit as claimed in claim 4, wherein a power management circuit is disposed on the control board, the power management circuit comprises an AND gate, a logic control module, and an output module; a plurality of input terminals of the AND gate are connected to the second feedback detecting leads at the corresponding positions; an output terminal of the AND gate is connected to an input terminal of the output module through the logic control module; and output terminals of the output module respectively output a first power supply voltage, a second power supply voltage, and a third power supply voltage.

6. The panel driving circuit as claimed in claim 5, wherein the second power supply voltage is greater than the first power supply voltage.

7. The panel driving circuit as claimed in claim 5, wherein the third power supply voltage is a gamma voltage.

8. The panel driving circuit as claimed in claim 5, wherein a time sequence of voltages outputted to the driving chips by the power management circuit outputs the first power supply voltage first, and then outputs the second power supply voltage and the third power supply voltage to the driving chips after the driving chips work normally.

9. The panel driving circuit as claimed in claim 1, wherein after color compression signals, control signals, and power supply signals are received by the control board and processed by a time schedule controller of the control board, processed signals are transmitted to the driving modules and are transmitted to a display panel by the driving modules.

10. The panel driving circuit as claimed in claim 1, wherein the driving circuit board generates scanning control driving signals in a horizontal direction of a screen according to time sequence signals transmitted by the control board.

11. A display device, comprising a display panel and the panel driving circuit as claimed in claim 1, wherein the panel driving circuit is connected to the display panel to drive the display panel to work.

\* \* \* \* \*